(12) United States Patent
Chhabra et al.

(10) Patent No.: US 10,686,605 B2
(45) Date of Patent: Jun. 16, 2020

(54) TECHNOLOGIES FOR IMPLEMENTING MUTUALLY DISTRUSTING DOMAINS

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 15/721,124

(22) Filed: Sep. 29, 2017

(65) Prior Publication Data

US 2019/0103976 A1 Apr. 4, 2019

(51) Int. Cl.
*H04L 9/32* (2006.01)
*G06F 9/455* (2018.01)
(Continued)

(52) U.S. Cl.
CPC ........ *H04L 9/3242* (2013.01); *G06F 9/45533* (2013.01); *G06F 9/45558* (2013.01); *G06F 12/1009* (2013.01); *G06F 12/1408* (2013.01); *G06F 12/1425* (2013.01); *G06F 21/00* (2013.01); *G06F 21/6209* (2013.01); *G06F 21/6218* (2013.01); *G06F 21/74* (2013.01);
(Continued)

(58) Field of Classification Search
CPC ............ G06F 9/45533; G06F 9/45558; G06F 9/45583; G06F 9/45587; G06F 12/14; G06F 12/1408; G06F 21/62; G06F 21/6209; G06F 21/6218; H04L 9/0643; H04L 9/3242
See application file for complete search history.

(56) References Cited

U.S. PATENT DOCUMENTS 6,115,394 A 9/2000 Balachandran et al.
8,819,455 B2 8/2014 Chhabra et al.
(Continued)

OTHER PUBLICATIONS

Restriction/Election Requirement dated Mar. 19, 2019 for U.S. Appl. No. 15/293,967, 7 pages.
(Continued)

*Primary Examiner* — Jeremy S Duffield
(74) *Attorney, Agent, or Firm* — Schwabe, Williamson & Wyatt, P.C.

(57) ABSTRACT

Technologies for providing shared immutable code among untrusting domains are provided. The untrusting domains may be cryptographically separated within a cloud computing service or environment. The shared immutable code may be a shared virtual machine monitor (sVMM) that is setup by system software to indicate that the sVMM code pages need integrity alone and should be protected with an integrity key associated with individual domains. This indication may be stored in page tables and carried over the memory bus to a cryptographic engine. The cryptographic engine may use this indication to protect the integrity of data before storing the data to memory. In order to ensure cryptographic isolation, integrity values may be generated using a domain-specific key ensuring that an attempt to modify the code by one domain is detected by a different domain. Other embodiments are described herein and claimed.

24 Claims, 4 Drawing Sheets

(51) Int. Cl.
  *H04L 9/06* (2006.01)
  *G06F 12/1009* (2016.01)
  *G06F 12/14* (2006.01)
  *G06F 21/74* (2013.01)
  *G06F 21/00* (2013.01)
  *G06F 21/62* (2013.01)

(52) U.S. Cl.
  CPC .. *H04L 9/0643* (2013.01); *G06F 2009/45583* (2013.01); *G06F 2009/45587* (2013.01); *G06F 2009/45591* (2013.01); *G06F 2009/45595* (2013.01); *G06F 2212/1052* (2013.01); *G06F 2212/402* (2013.01); *G06F 2212/65* (2013.01)

(56) References Cited

U.S. PATENT DOCUMENTS

| | | | |
|---|---|---|---|
| 9,213,653 B2 | 12/2015 | Durham et al. | |
| 9,335,943 B2 | 5/2016 | Sahita et al. | |
| 9,614,666 B2 | 4/2017 | Kishinevsky et al. | |
| 9,990,249 B2 | 6/2018 | Durham et al. | |
| 2007/0157003 A1 | 7/2007 | Durham et al. | |
| 2008/0059729 A1 | 3/2008 | Norberg et al. | |
| 2009/0204972 A1 | 8/2009 | Brice, Jr. et al. | |
| 2010/0174936 A1* | 7/2010 | Hill | G06F 1/10 713/500 |
| 2010/0281273 A1* | 11/2010 | Lee | G06F 21/72 713/190 |
| 2011/0302400 A1 | 12/2011 | Maino et al. | |
| 2012/0290850 A1 | 11/2012 | Brandt et al. | |
| 2013/0117577 A1 | 5/2013 | Hars et al. | |
| 2014/0089674 A1 | 3/2014 | Beuhl | |
| 2014/0372740 A1 | 12/2014 | Semenko et al. | |
| 2015/0036486 A1 | 2/2015 | McMurry et al. | |
| 2015/0121366 A1 | 4/2015 | Neiger et al. | |
| 2015/0161059 A1 | 6/2015 | Durham et al. | |
| 2015/0256516 A1 | 9/2015 | Martini et al. | |
| 2015/0294123 A1 | 10/2015 | Oxford | |
| 2015/0341466 A1* | 11/2015 | Sah | G06F 16/2471 707/770 |
| 2015/0370727 A1* | 12/2015 | Hashimoto | G06F 12/1416 711/163 |
| 2016/0087995 A1* | 3/2016 | Gehrmann | H04L 9/0822 713/156 |
| 2016/0148001 A1* | 5/2016 | Bacher | G06F 9/45558 713/189 |
| 2016/0163234 A1 | 6/2016 | Bacher et al. | |
| 2017/0171197 A1* | 6/2017 | Alexander | H04L 67/20 |
| 2017/0185532 A1 | 6/2017 | Durham et al. | |
| 2018/0032447 A1* | 2/2018 | Kaplan | G06F 12/1009 |
| 2018/0247082 A1 | 8/2018 | Durham | |
| 2018/0285140 A1* | 10/2018 | Kaplan | G06F 9/45558 |

OTHER PUBLICATIONS

Advanced Micro Devices, "Secure Encrypted Virtualization Key Management", Aug. 2016, 68 pages.
Advanced Micro Devices, "Secure Encrypted Virtualization Key Management", Jan. 2017, 92 pages.
Advanced Micro Devices, "AMD64 Architecture Programmer's Manual", AMD64 Technology, Dec. 2016, vol. 2: System Programming, cove page; pp. 207-210; pp. 531-544.
International Search Report and Written Opinion dated Nov. 29, 2017 for International Patent Application No. PCT/US2017/043024, 9 pages.
David Durham et al., "Secure Public Cloud", U.S. Appl. No. 62/373,627, filed Aug. 11, 2016, 70 pages.
David Durham et al., "Secure Public Cloud", U.S. Appl. No. 15/293,967, filed Oct. 14, 2016, 139 pages.
Intel Corpration, "Secure Public Cloud", International Application No. PCT/US2017/043024, filed Jul. 20, 2017, 148 pages.
"Intel® 64 and IA-32 Architectures, Software Developer's Manual, vol. 3 (3A, 3B, 3C & 3D): System Programming Guide"; May 2018; 1680 pages, Intel Corporation.
David Mulnix; "Enabling Virtual Machine Control Structure Shadowing on a Nested Virtual Machine With The Intel® Xeon® E5-2600 V3 Product Family"; Dec. 12, 2014.
"4th Generation Intel® Core(TM) vPro(TM) Processors with Intel® VMCS Shadowing"; 2013; Intel Corporation.
"Intel® Architecture Memory Encryption Technologies Specification"; Rev: 1.1; Dec. 2017.
Jun Nakajima; "Making Nested Virtualization Real by Using Hardware Virtualization Features"; May 28, 2013; Intel : Corporalion.
Orit Wasserman; "Nested virtualization: shadow turtles"; Red Hat; 2013.
Shay Gueron; "A Memory Encryption Engine Suitable for General Purpose Processors"; Intel Corporation; Feb. 25, 2016.
Baiju Patel; "Intel Releases New Technology Specification for Memory Encryption"; Dec. 22, 2017.
"5-Level Paging and 5-Level EPT"; May 2017; Intel Corporation.
David Durham et al., "Convolutional Memory Integrity", U.S. Appl. No. 15/089,140, filed Apr. 1, 2016 75 pages.
Office Action dated Jun. 4, 2019 for U.S. Appl. No. 15/089,140, 19 pages.

* cited by examiner

TECHNOLOGIES FOR IMPLEMENTING MUTUALLY DISTRUSTING DOMAINS

FIELD

The present disclosure relates to the field of computing systems, and in particular, to apparatuses, methods and storage media for implementing mutually distrusting domains including virtual machines or containerization.

BACKGROUND

Shared computing resources (e.g., one or more servers, computer storage devices, etc.) may utilize virtualization or containerization to isolate users and services from one another. Virtualization may refer to the abstraction of one or more isolated virtual machines ("VMs"), which are virtual versions of computer hardware platforms, storage devices, and/or network resource(s) that are operated by a virtual machine monitor ("VMM") and/or hypervisor on shared computing resources. Each VM may operate one or more applications to perform various functions and/or provide various services to an individual user. Containerization (also known as "operating system virtualization") may refer to the abstraction of multiple isolated user-space instances that may operate their own applications or services, run on a single host and access the same operating system (OS) kernel. Each user-space instance is referred to as a container, which is virtualized, software-defined environments in which software applications can run in isolation of other software running on a physical host machine. Virtualization and/or containerization are used for various systems including cloud computing systems in order to isolate user/customer domains. For example, a cloud service provider (CSP) may offer compute and other infrastructure capabilities to various users, customers, organizations (collectively referred to as "tenants" and the like) by consolidating hardware and software resources and sharing the resources between the various tenants.

The consolidation of resources in such systems may result in unique security and/or integrity challenges for both the CSP and the tenants. For instance, the tenants may operate workloads that abuse and/or waste computing resources, and in some cases, may interfere with the workloads of other tenants and/or CSP workloads. Tenant isolation through virtualization and/or containerization is one way to solve such trust issues. Where virtualization is used, the CSP may run tenant workloads in one or more corresponding VMs where the hypervisor or VMM is provided by the CSP. Where containerization is used, the CSP may run tenant workloads in one or more corresponding containers and the CSP may provide a virtualization layer or a trust layer to ensure that individual containers do not interfere with one another. In this way, virtualization or containerization may allow the CSP to be in control of the system hardware and provide some notion of isolation to tenants. While this model addresses some security issues from a CSP point of view, it does not provide assurance to the tenants that their data or applications are not being accessed by unauthorized users. Some solutions to address these concerns include duplicating VMM code across multiple tenant domains, resulting in inefficient memory usage. Additionally, since duplicated VMM code is encrypted using unique VM keys, such solutions do not allow the CSP to inspect VMM code to provide bug fixes, security patches, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Embodiments are directed towards providing immutability among various untrusting domains, where the domains may be virtual machines (VMs) and/or containers. According to various embodiments, one or more processors may host a plurality of virtual machines (VMs), wherein individual VMs of the plurality of VMs may be arranged into a plurality of mutually untrusting domains. In the context of cloud computing services, any workload provided by an individual user that needs to run in isolation from any other code running on the service provider hardware constitutes a domain. Examples may include a native Operating System (OS), one or more VMs running on top of a user-provided VMM, a VM running on top of service provider provided VMM, one or more containers running within one or more VMs that run on top of a user-provided VMM or a service provider-provided VMM, and the like.

In embodiments, each untrusting domain may be associated with (e.g., operated or implemented by) individual cloud computing clients of a plurality of cloud computing clients. In embodiments, the one or more processors may provide and/or operate a shared virtual machine manager (sVMM). The sVMM may manage operations of the individual VMs of each domain. The sVMM is respectively integrity protected with integrity keys associated with individual domains of the untrusting domains, and in various embodiments, the sVMM is not encrypted. Embodiments also provide a cryptographic engine (CE) to provide separated encryption services for the plurality of mutually untrusting domains and provide integrity protection services for individual ones of the plurality of mutually untrusting domains when accessing the sVMM. Other embodiments are described and/or claimed.

In various embodiments, the sVMM may be setup by system software to indicate that sVMM code pages need integrity alone and should be protected with integrity keys associated with individual domains. This indication may be stored in page tables and carried over a memory bus to the CE. The CE may use the indication to protect the integrity of the data line (or memory location) before storing it to memory. In order to ensure cryptographic isolation, the integrity values may be generated using one or more domain-specific keys to ensure that an attempt to modify the code by one domain is detected on use by a different domain. In addition to ensuring code immutability, the embodiments herein may allow inspection of the sVMM code by a service provider, such as a CSP.

The embodiments herein may be implemented in cloud computing environments. Typical solutions for providing VM-related services in cloud computing environments require code duplications (e.g., VMM code) across multiple domains resulting in inefficient memory usage. Additionally, some solutions remove the cloud service provider (CSP)-provided VMM/hypervisor out of the CSP's trusted computing base (TCB) using cryptographic isolation such that the VMM/hypervisor provided by the CSP cannot access tenant data. This is achieved by encrypting tenant data using a key that is only known by the tenant. However, such solutions do not allow CSPs to inspect VMM code, which may be critical for CSPs to ensure that the underlying VMM image has not been modified in ways that can impact system availability and/or interfere with other VMs in other domains. The embodiments herein provide immutable and cryptographically isolated code while providing inspection capabilities, which can prove to be a critical component in some systems, such as cloud computing services. The embodiments discussed herein are based on the principle that the VMM code used by a domain needs integrity but not encryption to ensure that the VMM image verified by the customer before launch is not modified afterwards. It should also be noted that while the embodiments are described in the context of CSPs where user workloads run in isolation from each other, the embodiments discussed herein may also be applicable to other systems and scenarios where code needs to be shared between mutually untrusting entities and/or where integrity protection is desired.

The embodiments herein may also be implemented to provide update various applications, such as security applications and the like. For example, the consumer credit reporting agency, Equifax, Inc., experienced a data breach in mid-2017 where the personally identifying information of approximately 143 Million people were stolen. The root cause of this data breach has been reported to be a vulnerability in a common library of the Apache Struts framework (CVE-2017-5638). Security applications tend to include exclusive copies of library code that are statically linked, meaning there is a separate copy of the library with each application. When a major critical vulnerability is found and patched in a common library like Apache Struts, used by a large number of separate applications, it becomes a very onerous and error-prone task to patch or fix each library in each application. In some cases, each application vendor needs to independently release patches for their individual applications on different time lines, and these need to be deployed by information technology (IT) departments on timelines that limit critical services downtime. In the case of Equifax, the vulnerability was patched in Mar. 7, 2017, reported as a critical fix, yet the company had failed to apply the security updates before the attack occurred two months later, long after the vulnerability was being widely exploited by hackers. The embodiments herein may allow multiple security applications to share common immutable library code with just one copy of the library code. In this way, all the security applications may be patched/fixed at once simply by fixing the single copy of the affected shared library.

Aspects of the disclosure are disclosed in the detailed description section infra. Alternate embodiments of the present disclosure and their equivalents may be devised without parting from the spirit or scope of the present disclosure. It should be noted that like elements disclosed below are indicated by like reference numbers in the drawings. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The description may use the phrases "in an embodiment", "in an implementation", or in "embodiments" or "implementations", which may each refer to one or more of the same or different embodiments. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Moreover, the terms "comprising," "including," "having," and the like, as used with respect to embodiments of the present disclosure, are synonymous.

Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

As used herein, the term "circuitry" refers to, is part of, or includes hardware components such as an Application Specific Integrated Circuits (ASICs), field-programmable gate array (FPGAs), programmable logic arrays (PLAs), complex programmable logic devices (CPLDs), one or more electronic circuits, one or more logic circuits, one or more processors (shared, dedicated, or group) and/or memory (shared, dedicated, or group) that are configured to provide the described functionality. In some embodiments, the circuitry may execute computer-executable instructions to provide at least some of the described functionality. The computer-executable instructions may represent program code or code segments, software or software logics, firmware, middleware or microcode, procedures, functions, subprograms, routines, subroutines, one or more software packages, classes, or any combination of instructions, data structures, program statements, and/or functional processes that perform particular tasks or implement particular data types. The computer-executable instructions discussed herein may be implemented using existing hardware in computer devices and communications networks.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof, such as cellular phones or smart phones, tablet personal computers, wearable computing devices, an autonomous sensors, laptop computers, desktop personal computers, video game consoles, digital media players, handheld messaging devices, personal data assistants, an electronic book readers, augmented reality devices, Universal Serial Bus (USB) hubs, Keyboard Video Mouse (KVM) switches/hubs, docking stations, port replicators, server computer devices, cloud computing services/systems, network elements, and/or any other like electronic devices. Examples server computer devices may include a rack computing architecture component, a tower computing architecture component, a blade computing architecture component, etc. Additionally, the term "computer system" and/or "system" may refer to various components of a computer device that are communicatively coupled with one another. Furthermore, the term "computer system" and/or "system" may refer to multiple computer devices and/or multiple computing systems that are communicatively coupled with one another and configured to share computing and/or networking resources.

As used herein, the term "computing resource", "hardware resource", "resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network.

Reference will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. In addition, various additional operations might be performed, or described operations might be omitted in additional or alternative embodiments. Furthermore, the inclusion of a structural or method feature in a particular figure is not meant to imply that such feature is required in all embodiments and, in some embodiments, may not be included or may be combined with other features. Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

Figure 1:
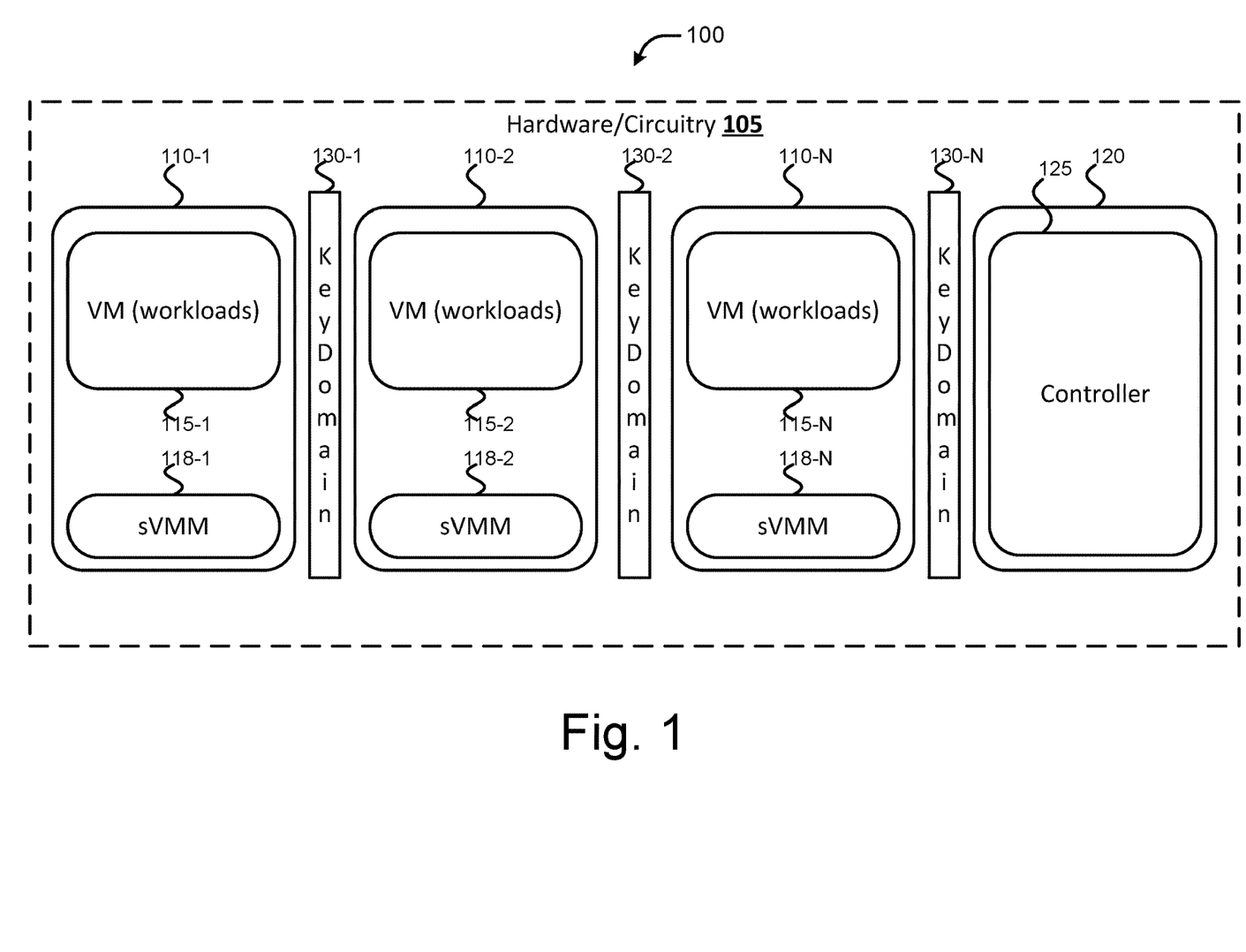
FIG. 1 illustrates an example environment for practicing various embodiments of the present disclosure.

Referring now to the figures. FIG. 1 depicts an example of cryptographically isolated domains within an environment 100 in accordance with various embodiments. Environment 100 may include domains 110-1 to 110-N (collectively referred to as "domains 110" and the like) and an operator domain 120 (also referred to as a "system administrator domain" and the like). The domains 110 and 120 are separated by respective key domains 130-1 to 130-N (collectively referred to as "key domains 130" and the like). The following description is provided for an example environment 100 that operates as an isolated VM system where each domain 110 operates one or more isolated VMs 115. However, the example embodiments are not limited in this regard and the described embodiments may apply to other systems, such as systems that implement containerization and the like.

In various embodiments, the environment 100 may be implemented using hardware/circuitry 105. The hardware/circuitry 105 may be implemented in or by any computer system described herein, or component thereof, such as the system 300 described with reference to FIG. 3. In various implementations, the environment 100 (and hardware/circuitry 105) may be part of a cloud computing service and/or an enterprise network where various locations of the cloud computing service or enterprise may be dispersed in diverse geographic areas and one or more servers within connected data centers may operate the environment 100. In other implementations, the environment 100 may be part of a local/edge cloud system or fog computing system, where the environment 100 is implemented by an edge computing device, which in combination with other edge computing devices, perform various functions/services, such as cloud computing-based functions/services.

The domains 110 may comprise one or more workloads provided by individual users that run or operate in isolation from other code running on the hardware/circuitry 105. Each of the domains 110 may operate respective virtual machines (VMs) 115-1 to 115-N (collectively referred to as "VMs 115" and the like) and respective instances of a shared virtual machine monitor (sVMM) 118-1 to 118-N (collectively referred to as "sVMM instance 118", "sVMM 118", "sVMM 118 image", and the like). In embodiments, the VMs 115 may operate various applications (not shown by FIG. 1). In some embodiments, the domains 110 may operate respective application containers instead of, or in addition to the VMs 115.

The individual domains 110 may be cryptographically isolated from one another by unique domain-specific keys, which is represented by the key domains 130 shown by FIG. 1. The domain-specific keys may be used to encrypt/decrypt domain-specific data and integrity protect instances of shared immutable code. The operator domain 120 is a domain of the service provider or system administrator that owns and/or operates the environment 100. The controller 125 may be one or more VMs and/or software applications that perform various resource management functions, such as verifying shared VMM (sVMM) operations, switch execution to a domain, and/or the like. Since the controller 125 runs inside the operator domain 120, the controller 125 is unable to read the data of the different domains 110 while the controller 125 performs the resource management functions. A detailed discussion of isolated VM execution implementations is discussed in the commonly assigned Provisional Patent App. No. 62/373,276 titled "SECURE PUBLIC CLOUD", which is incorporated by reference in its entirety.

In a cryptographically isolated domain system, such as environment 100, each domain 110 may be associated with a domain identifier (DID), which is a unique identity that is assigned by hardware 105 and is immutable, at least from a software point of view. Each memory access may be tagged with the DID associated with the domain 110 and/or VM 115 making the access. In some implementations, the DID can be one or more bits carried as part of a physical address (or physical address space) of a domain 110, which may reduce the total physically addressable memory. In other implementations, separate one or more bits may be used for the DID, which can be introduced to the memory interface. In some implementations, the DID may be (or may be based on) a virtual-processor identifier (VPID), which may be an identity of a virtual processor used by a domain 110 or VM 115 and may provide a mechanism to identify address spaces for different "virtual processors." In some embodiments, each cryptographically isolated domain 110 may include its own cryptographic circuitry/engine. In such systems, the encryption circuitry/engine of the hardware/circuitry 105 receiving the memory access may use the DID of the VM 115 or the domain 110 to obtain a domain-specific key to be used for encrypting/decrypting the access.

Figure 2:
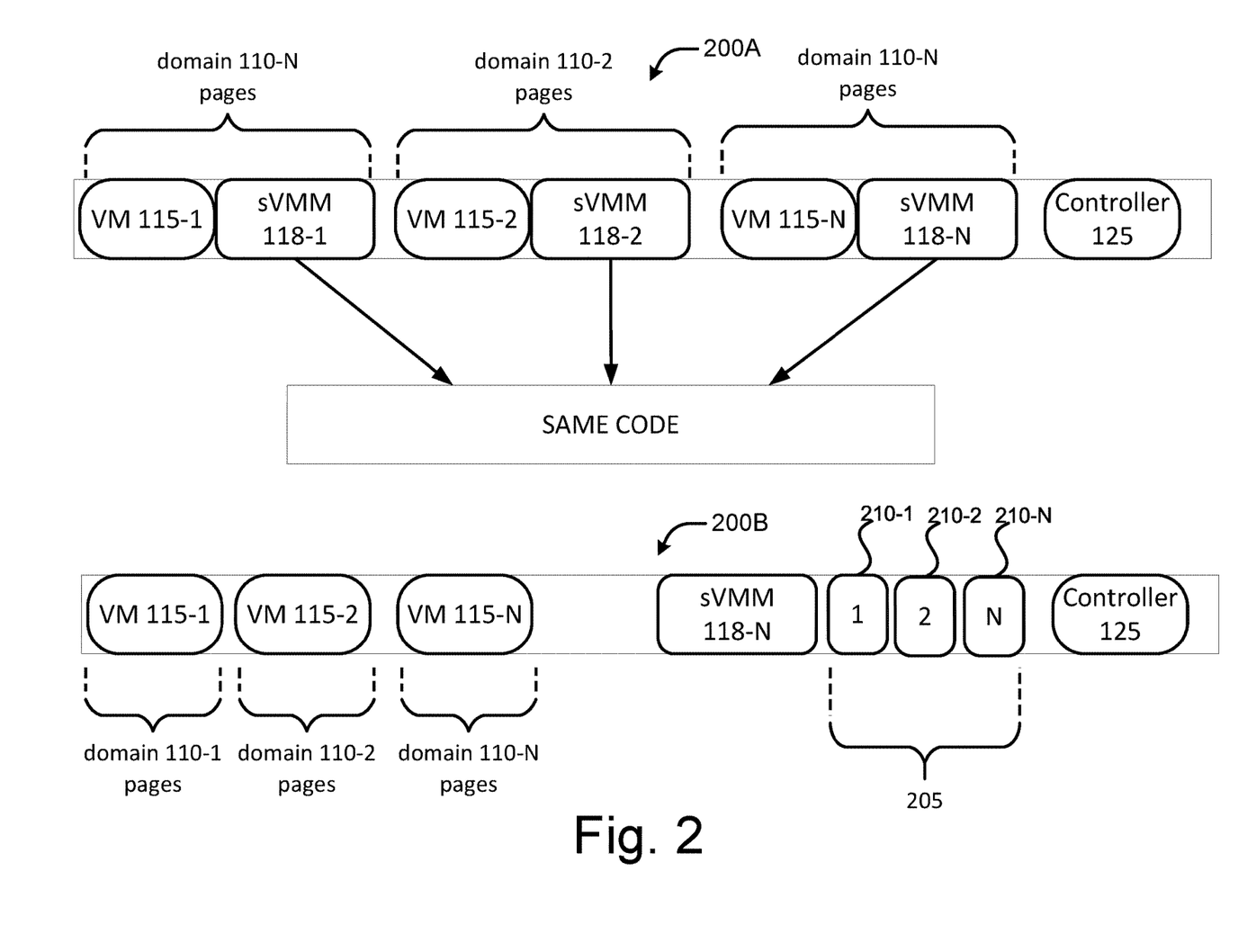
FIG. 2 illustrates example memory layouts in accordance with various embodiments.

The memory accesses may include accessing domain-specific data and/or accessing a respective sVMM instance 120. As used herein, the term "instance" may refer to a concrete occurrence of an object, which may occur, for example, during execution of application code, and the terms "instantiate", "instantiation", etc. may refer to the creation of an instance. The sVMMs 118 instances (also referred to as "VMMlets" and the like) may be used to provide isolation among the mutually untrusting domains 110. This is because the sVMM 118 instances allow the functions/processes typically performed by a VMM or hypervisor to be removed from the trusted computing base of the operator domain 120. In this way, the operator may still provide a VMM, which the customer can verify and include as part of a respective VM 115 or domain 110 image to run on the hardware/circuitry 105. The VMs 115 along with the sVMM instance 118 forms a cryptographic domain 110 and is protected using the previously discussed domain-specific keys. However, the sVMM 118 image inside each domain 110 may need to be replicated and since the sVMM 118 (originally provided by the operator) is encrypted with the domain-specific keys. Due to the encryption of the sVMM 118 images, the operator may be unable to inspect and fix sVMMs 118, which it might need to do to ensure that the right image is being used by a corresponding domain 110 (e.g., for availability). An example of such a scenario is shown by FIG. 2. In some embodiments, the cryptographic circuitry/engine may provide separated encryption services for the plurality of mutually untrusting domains 110, and provide integrity protection services for individual ones of the plurality of mutually untrusting domains 110 when accessing the sVMM 118.

FIG. 2 depicts example memory layouts 200A and 200B for the isolated domains of FIG. 1. Memory layout 200A is a high-level view of cryptographically isolated VMs 115 where only code pages are shown. In memory layout 200A, the same sVMM 118 code is replicated across different domains 110 (e.g., within pages associated with each domain 110) resulting in inefficient use of the system memory and other computing resources.

Memory layout 200B is a high-level view of cryptographically isolated VMs 115 in accordance with various embodiments. In memory layout 200B, rather than replicating the sVMM 118 image across each domain 110 (and the pages of each domain 110), a single immutable sVMM 118 image is shared among the domains 110 where per-domain integrity values are stored in association with the sVMM 118 image. In memory layout 200B, the overhead for the sVMM 118 image may be reduced from one copy per domain 110 to the space required for the per-domain integrity values. For example, a 64 bit integrity value may require 12.5% of the storage overhead used in memory layout 200A (e.g., 64 bits per 64 Bytes cacheline).

According to various embodiments, immutable code is used to enable the multiple VMs 115 to share the sVMM 118 code while maintaining privacy assurance and data integrity for each domain 110. Aspects of the embodiments discussed herein are based on the observation that the sVMM 118 code does not need privacy and can be shared among domains based on data integrity. In this way, the sVMM 118 code may be observable to an operator of the environment 100, and may allow the operator to ensure that the sVMM 118 is operating properly and has not been compromised in ways that can affect the availability of the platform, for example.

Immutable code provides integrity to the sVMM 118 code using domain-specific keys. The domains 110 and domain-specific keys may be setup or created according to known methods/procedures. However, in embodiments the domains 110 may be responsible for generating their own domain-specific keys and programming the domain-specific keys to the encryption circuitry (e.g., cryptographic engine 322 of FIG. 3), which supports multiple keys. According to various embodiments, each domain 110 may generate two keys, where a first key is used for encryption of domain data (e.g., an "encryption key") and a second key is used for integrity protection of shared immutable code, for example, the sVMM 118 code (e.g., an "integrity key"). For example and as discussed infra, encryption circuitry (e.g., cryptographic engine 322 of FIG. 3) may use a DID to access domain-specific keys (including encryption/decryption keys and integrity protection keys) for a corresponding domain 110 for each memory access made by that domain 110 and/or a VM 115 residing within that domain 110.

In addition, embodiments also provide one or more fixed integrity range(s) 205 in memory to store integrity values 210-1 to 210-N associated with each domain 110-1 to 110-N. As discussed previously, there may be a single image of the sVMM 118 that is shared among some or all domains 110, but each domain 110 may have its own integrity values generated using its domain-specific keys. In order to store the integrity values associated with the sVMM 118 for each domain 110, system firmware, such as a basic input/output system (BIOS), may reserve memory space as an integrity range 205 associated with each domain 110. In some cases, some domains 110 may be created on demand, and hence boot time allocation might not be practical. In such cases, the controller 125 may reserve memory space for the integrity range 205 associated with the domain 110 created on-demand.

Figure 3:
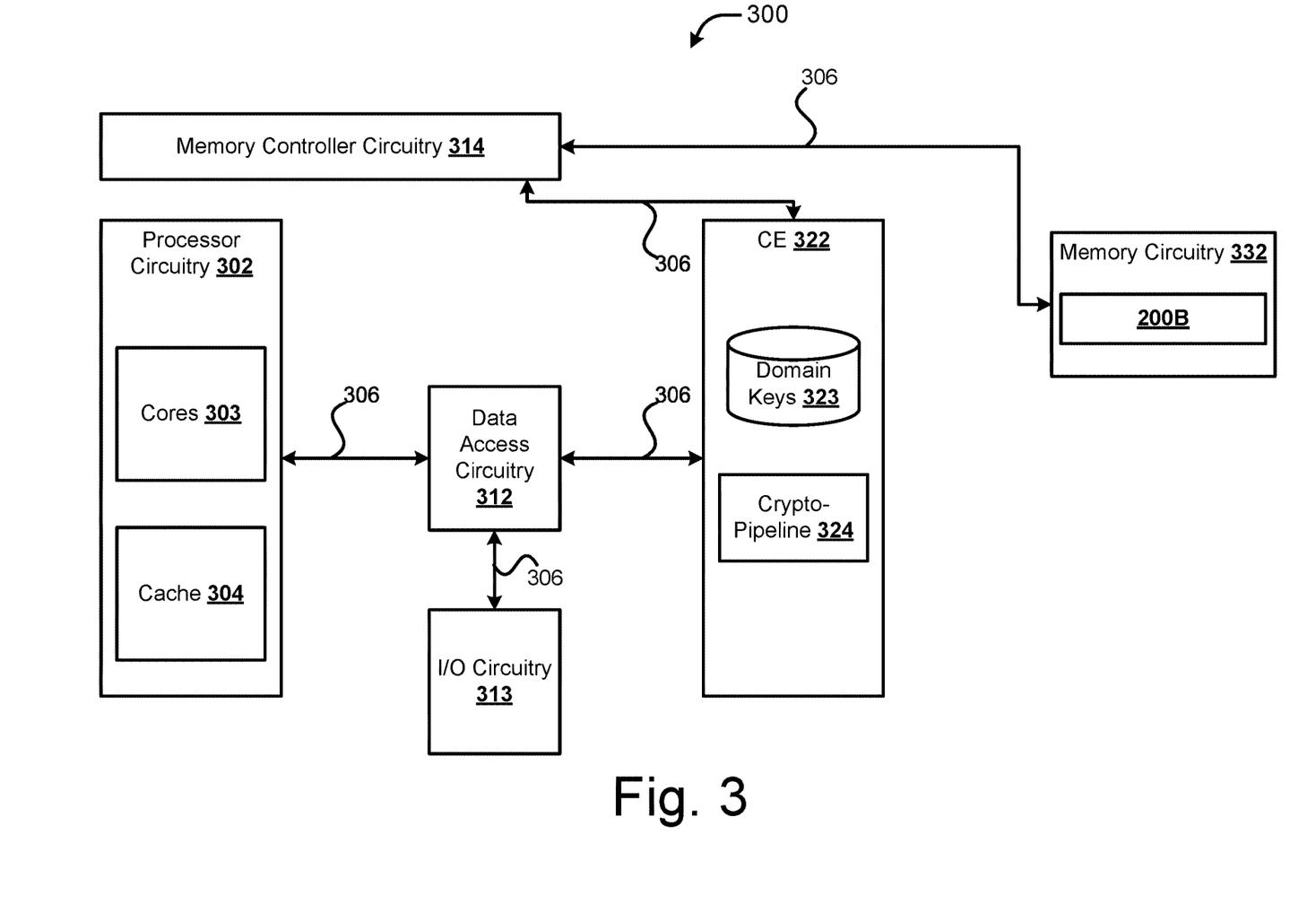
FIG. 3 illustrates the components of a computer platform suitable for practicing various embodiments of the present disclosure.

Embodiments also provide an immutable bit (I-bit) set (e.g., one or more I-bits) in one or more page tables, which may be used by the encryption circuitry (e.g., cryptographic engine 322 of FIG. 3) to determine when the shared immutable code (e.g., the sVMM 118) is being accessed from memory (e.g., memory circuitry 332 of FIG. 3). In embodiments, virtual or logical addresses of the shared immutable code may be mapped to one or more page table entries (PTEs) in one or more page tables, where the PTEs of the shared immutable code include an I-bit set for each domain 110. When a request to access the shared immutable code from memory is issued, the I-bit set, along with the domain information (e.g., a domain ID) in some embodiments, may be sent to the encryption circuitry. Upon receipt of such a request, the encryption circuitry may check or verify the integrity of the data line loaded from memory using a domain key associated with the requesting domain 110. This is discussed in more detail infra with regard to FIG. 4.

FIG. 3 illustrates an example implementation of a computing platform 300 suitable for practicing the various embodiments of the present disclosure. The platform 300 may be embodied as any type of computation, computer device or computer system capable of performing various arithmetic, logical, input/output (I/O) operations. In embodiments, the platform 300 may be suitable to implement environment 100, or portions thereof. FIG. 3 shows a block diagram of an example of components that may be present in the platform 300. The platform 300 may include any combinations of the components shown in the example. The components may be implemented as integrated circuits (ICs), portions thereof, discrete electronic devices, or other modules, logic, hardware, software, firmware, or a combination thereof adapted in the platform 300, or as components otherwise incorporated within a chassis of a larger system. The block diagram of FIG. 3 is intended to show a high level view of components of the platform 300. However, some of the components shown may be omitted, additional components may be present, and different arrangement of the components shown may occur in other implementations. For example, the platform 300 may include additional or alternative components commonly found in computer devices, such as a display module and/or one or more display devices; network interface circuitry, power management circuitry; one or more batteries; one or more sensors; short range radiofrequency communications circuitry, cellular modem circuitry, etc. The platform 300 may include processor circuitry 302, data access circuitry 312, I/O circuitry 313, memory controller circuitry 314, cryptographic engine circuitry (CE) 322, and memory circuitry 332, which may be communicatively coupled with one another via interconnect 306.

Processor circuitry 302 may be configured to carry out functions of the embodiments discussed herein by performing the basic arithmetic, logical, and input/output operations of the platform 300. The processor circuitry 302 may be a microprocessor, a single-core processor, a multi-core processor, a multithreaded processor, an ultra-low voltage processor, an embedded processor, graphics processing unit (GPU), or other known processing element. The processor circuitry 302 may be a part of a system on a chip (SoC) in which the processor circuitry 302 and other components are formed into a single integrated circuit, or a single package. As an example, the processor circuitry 302 may include an Intel® Architecture Core™ based processor, such as an i3, an i5, an i7 a Quark™, an Atom™, a Xeon™ series, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

Additionally or alternatively, processor circuitry 302 may include programmable circuitry such as, but not limited to, one or more hardware accelerators and/or field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of processor circuitry 302 may comprise logic blocks or logic fabric including and other interconnected resources that may be programmed to perform various functions, such as the procedures, methods, functions, etc. of the various embodiments discussed herein. In such embodiments, the circuitry of processor circuitry 302 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

As shown, the processor circuitry 302 may include one or more cores 303 and cache 304. The cores 303 may be a component that includes two or more processing units that read and execute program code (or are programmed with logic blocks for accelerator based implementations). Each core 303 may include hardware components to fetch and decode instructions, schedule instructions for execution, execute the instructions, and fetch data for instruction execution, and store data produced by execution of instructions. The cache 304 may be embodied as any type of cache memory that the processor circuitry 302 can access more quickly than the memory circuitry 332 for storing instructions and/or data for execution, such as an on-die cache or an on-processor cache. The cache 304 may comprise level (L)1, L2, L3, or last level cache (LLC), which may be the highest-level cache that is called before accessing memory circuitry 304. In some implementations, the cache 304 of the processor circuitry 302 may comprise L1 and L2 cache whereas the data access circuitry 312 may comprise L3 and/or LLC (not shown by FIG. 3). In some embodiments, the cache memory may be an off-die cache, but reside on the same SoC as the processor circuitry 302. In some embodiments, processor circuitry 302 may also include one or more hardware accelerators, such as programmable circuits, FPGAs, etc., that may perform similar functions as the cores 303.

The processor circuitry 302 may perform a variety of functions for the platform 300 by executing program code, logic or software modules, firmware, middleware, microcode, hardware description languages, and/or any other like set of instructions stored in the memory circuitry 332. These functions may include virtualization functions, such as performing translations between domain 110 requests/instructions and the hardware platform 300. In this regard, the processor circuitry 302 may be enabled with a virtualization technology (VT), such as Intel® VT, which generally addresses VM to physical machine usage models and enables various VMM implementations. In order to perform the functions of the program code, the processor circuitry 302 may issue instruction set commands (e.g., Streaming single instruction multiple data (SIMD) Extensions 4 (SSE4), SEE5, Advanced Vector Extensions (AVX), Virtual Machine Extensions (VMX), MMX, Floating-Point-Unit (FPU) instructions (x87), Advanced Encryption Standard New Instructions (AES-NI), etc.) to the other elements of the platform 300 to, for example, access domain-specific code/data and shared immutable code (e.g., sVMM 118) from the system memory.

The program code may be provided to processor circuitry 302 by memory circuitry 332 via interconnect 306, via NIC or a separate drive mechanism (not shown). On execution of the program code by the processor circuitry 302, the processor circuitry 302 may cause the platform 300 to perform the various operations and functions delineated by the program code, such as the various example embodiments discussed herein. In embodiments where processor circuitry 302 includes (FPGA based) hardware accelerators as well as processor cores, the hardware accelerators (e.g., the FPGA cells) may be pre-configured (e.g., with appropriate bit streams) with the logic to perform some of the functions of the various embodiments herein (in lieu of employment of programming instructions to be executed by the processor core(s)).

The interconnect 306 may include any number (or combination) of interconnect and/or bus technologies including a lightweight in-die interconnect (IDI), Embedded Multi-die Interconnect Bridge (EMIB), industry standard architecture (ISA), extended ISA (EISA), peripheral component interconnect (PCI), peripheral component interconnect extended (PCIx), PCI express (PCIe) including PCIe Direct Media Interface (DMI)/Direct Memory Access (DMA) and M2PCIe, Thunderbolt, a Time-Trigger Protocol (TTP) system, or a FlexRay system, or any number of other technologies. The interconnect 306 may be a proprietary bus or interconnect technology, for example, used in a SoC based system such as QuickPath Interconnect (QPI) provided by Intel®, UltraPath Interconnect (UPI) provided by Intel®, SoC Ring Interconnect or Ring Link provided by Intel®, etc. Other bus systems may be included, such as an inter-integrated circuit (I2C or I$^2$C) interface, an Small Computer System Interface (SCSI) Parallel Interface (SPI), interface, point to point interfaces, and a power bus, among others. In embodiments, the interconnect 306 may be used to convey the I-bit set and/or the DID from the cores 303 to the data access circuitry 312 and to the CE 322.

Data access circuitry 312 (also referred to as "data port circuitry", "uncore", and the like) may be any component, or combination of components that perform functions that are not performed by the processor circuitry 302, and in particular, the cores 303. The data access circuitry 312 may handle all accesses from the interconnect 306 domain and from the input/output (I/O) domain, and route the accesses to the appropriate place. Data access circuitry 312 functions may include control and management of interconnect 306, control/management of memory and I/O accesses, L3/LLC caching, etc. In some implementations, the data access circuitry 312 may be implemented as one or more separate microprocessors, while in other embodiments, the data access circuitry 312 may comprise circuitry that is part of a GPU, image processing unit (IPU), or display engine, and the like. In some implementations, the data access circuitry 312 may comprise one or more microprocessors (or controllers) to perform such functions. data access circuitry I/O circuitry 313 may comprise various hardware components that are used to access off-chip components and/or external devices. The hardware components may include controllers for various ones of the interconnect 306 technologies. For example I/O circuitry 313 may comprise PCIe controllers and/or Thunderbolt controllers to connect platform 300 to external devices, UPI controllers for controlling data exchanges among platform 300 components, and the like. I/O circuitry 313 may also include various display controllers for handling internal graphic operations, such as an integrated display engine, Flexible Display Interconnect, Display Port, and/or other like display controllers. In some embodiments, the I/O circuitry 313, or portions thereof, may be implemented in or by a platform controller hub (PCH), which may control certain data paths and support functions used in conjunction with processor circuitry 302. In various implementations, all off chip system memory transactions to/from processor circuitry 302 may be facilitated by interconnect 306 thru the data access circuitry 312, and through the unified DRAM memory controller.

Memory controller circuitry 314 may comprise any suitable hardware component, or combination of hardware components, that provide an interface between memory circuitry 332 and the other components of platform 300. For example, the memory controller circuitry 314 may be one or more of double data rate (DDR) memory controller, dual-channel memory controller, a fully buffered dual inline memory module (FB DIMM), a memory management unit, a memory controller unit (MCU), an integrated memory controller (IMC), a memory chip controller (MCC), among others. The memory controller circuitry 314 may include logic for reading, writing, and refreshing the memory circuitry 304. The memory controller circuitry 314 may communicate with memory circuitry 304 by translating read and write commands into specific memory commands, and may schedule the specific memory commands according to memory circuitry timing. Reading and writing to the memory circuitry 304 is performed by selecting the row and column data addresses of the memory circuitry 332 as the inputs to a multiplexer circuit, where a demultiplexer of the memory circuitry 332 uses the converted inputs to select a correct memory location and return the stored data, which is then passed back through a multiplexer to consolidate the data in order to reduce the required bus width for the operation. The other main function of the memory controller is advanced error correcting code (ECC) support, lockstep memory access retry, memory scrubbing, thermal throttling, mirroring, rank sparing, among others.

CE 322 may comprise any suitable hardware and/or software components, or combination of hardware and/or software components, that provide integrity and encryption/decryption services for the platform 300. In embodiments, the CE 322 may obtain the I-bit set and/or the DID from the cores 303 via the data access circuitry 312 over the interconnect 306. The CE 322 may consume the I-bit set and/or the DID to lookup keys associated with a domain 110 for accessing shared immutable code (e.g., sVMM 118). In some embodiments, the CE 322 may not propagate the I-bit set and/or the DID downstream, which may allow the memory controller circuitry 314 to operate without requiring modification.

In various implementations, the CE 322 may be one or more hardware components, including special purpose components, specifically designed to secure hardware by carrying out cryptographic operations. The hardware component(s) of the CE 322 may be disposed on or in the memory path. The hardware component(s) of the CE 322 may comprise one or more microprocessors, SoCs, or System-in-Packages (SiPs) (e.g., digital signal processors (DSPs), digital signal controllers (DSCs), cryptoprocessors, etc.), cryptographic accelerators (e.g., FPGAs, coprocessors, etc.), and/or any other suitable device(s). Additionally, in some implementations, the CE 322 may comprise a dedicated memory, which may be any suitable memory device discussed herein, or combination thereof. The dedicated memory may store program code (e.g. firmware, logic blocks, etc.) to perform cryptographic processing operations on read and/or write accesses as discussed herein. In this regard, the CE 322 may include domain keys database (DB) 323 and crypto-pipeline 324.

Domain keys DB 323 may be a database object that stores domain integrity and/or encryption keys in association with domain identifiers (DIDs) and/or other like information. A "database object" may refer to any representation of information in a database that is in the form of an object or tuple, and may include variables, data structures, functions, methods, classes, database records, database fields, database entities, associations between data and database entities (also referred to as a "relation"), and the like. In one example, the domain keys DB 323 may be a table (e.g., a "key table"), where fields or records in the table include the domain keys for individual domains 110. In another example, the domain keys DB 323 may be embodied as a hash table that stores key-value pairs (where the key of the key-value pair is different than the domain integrity/encryption keys). In this example, a key or other like identifier may be used to obtain an index (e.g., a domain index) that indicates where a value (e.g., a domain integrity/encryption key) of the key-value pair may be found in the domain keys DB 323. In this example, the domain keys DB 323 may be built using the perfect hashing scheme, cuckoo hashing, or some other suitable hashing scheme. The domain keys DB 323 may be built or formed using any other suitable mechanism/procedure in other embodiments, and the methods/procedures to access the domain keys may be based on how the domain keys DB 323 is constructed.

The keys stored by the domain keys DB 323 may be used to calculate integrity values and/or to encrypt/decrypt data being communicated through the CE 322. The keys used for calculating integrity values may be different than those used for encryption/decryption. In some embodiments, the keys may be generated based on one or more measurements of the processor circuitry 302, however, any suitable algorithm or operations may be used for key generation, encrypting/decrypting data, and/or generating integrity values.

Cryptographic pipeline (crypto-pipeline) 324 may be a set of cryptographic operations or stages used for encrypting/decrypting data and/or calculating integrity values. Each of the cryptographic operations/stages may be connected in series, such that the output of one stage/operation is a required input to a subsequent operation/stage. The series of operations/stages may be defined by any suitable cryptographic algorithms for encrypting/decrypting data public and/or for generating integrity values. The cryptographic algorithms may include asymmetric (public key) encryption algorithms (e.g., digital signature algorithms (DSA), key generation and exchange algorithms, key agreement algorithms, elliptic curve cryptographic (ECC) algorithms, Rivest-Shamir-Adleman (RSA) cryptography, etc.), symmetric (secret key) encryption (e.g., advanced encryption system (AES) algorithms, triple data encryption algorithms (3DES or TDES), twofish, threefish, etc.), and/or crypto-graphic hash functions (e.g., secure hash algorithms (SHA), keyed-hash message authentication code (HMAC), BLAKE hash functions, Whirlpool, etc.).

In various implementations, the CE 322 may reside or other be disposed in a memory path between the processor circuitry 302 and the memory circuitry 332. The CE 322 may receive a request for immutable code from one or more of the domains 110 implemented by the processor circuitry 302. The request may include or indicate an I-bit set and a DID of the requesting domain may be sent with the request or may be otherwise passed to the CE 322. When the CE 322 receives a request related to immutable code (e.g., indicated by an I-bit set), the CE 322 may proceed to check if the request is a read request or a write request.

When the request is a read request, the CE 322 may issue a read command to the memory controller circuitry 314 to read a data line or memory location indicated by the request (a "requested data line"), as well as a read command to read the data line/memory location storing an integrity value (e.g., a message authentication code (MAC)) for the requested data line. When the CE 322 obtains the read data and the stored integrity value (e.g., a reference value, reference MAC, and the like) from the memory controller circuitry 314, the CE 322 may perform a lookup operation on the keys DB 323 to obtain a domain key of the requesting domain 110, and implement the crypto-pipeline 324 to generate another integrity value (e.g., a MAC) using the obtained domain key. The CE 322 may implement the crypto-pipeline 324 to compare the generated integrity value with the reference integrity value read from memory. If the integrity values match, the CE 322 may obtain a decryption key from the keys DB 323, decrypt the data read from the requested data line, and may send the decrypted data to the requesting domain 110. If the integrity values do not match, the CE 322 may issue a security exception.

In some cases, the CE 322 may receive a write request for writing data to the immutable code region from one of the domains 110, such as when a domain 110 operates malicious or buggy code. When the CE 322 receives a write request, the CE 322 may write encrypted data to a data line/memory location indicated by the request along with an updated integrity value using a domain key associated with the domain 110 that issued the write request. When another domain 110 reads the immutable code (e.g., the sVMM 118) for execution, the other domain 110 may use its domain key to verify the integrity value that it had generated over unmodified data and consequently, results in an integrity value mismatch thereby detecting the write to the immutable code.

Memory circuitry 304 may be embodied as any type of volatile or non-volatile memory or mass data storage device(s). The memory circuitry 332 may be configured to store the domains 110 and 120, and the sVMM image in accordance with the memory layout 200B discussed previously. The memory circuitry 304 may also store an operating system (OS) and program code for one or more software components and/or applications. The aforementioned elements may be stored in any suitable combination of system memory and/or mass data storage devices.

As examples, the system memory can be any suitable combinations of random access memory (RAM), such as dynamic RAM (DRAM), multi-channel DRAM (MCDRAM), DDR DRAM or synchronous DRAM (SDRAM) or variants thereof, low power DDR (LPDDR) RAM or variants thereof, dual inline memory modules (DIMMs) of different varieties including but not limited to microDIMMs or MiniDIMMs. As examples, the mass data storage may be implemented via a solid state disk drive (SSDD); flash memory cards, such as SD cards, microSD cards, xD picture cards, and the like; and USB flash drives; on-die memory or registers associated with the processor circuitry 302; a hard disk drive (HDD) and/or micro HDD; resistance change memories; phase change memories; holographic memories; chemical memories; three dimensional cross-point (3D XPOINT) memories, such as those provided by Intel® and Micron®; among others.

Figure 4:
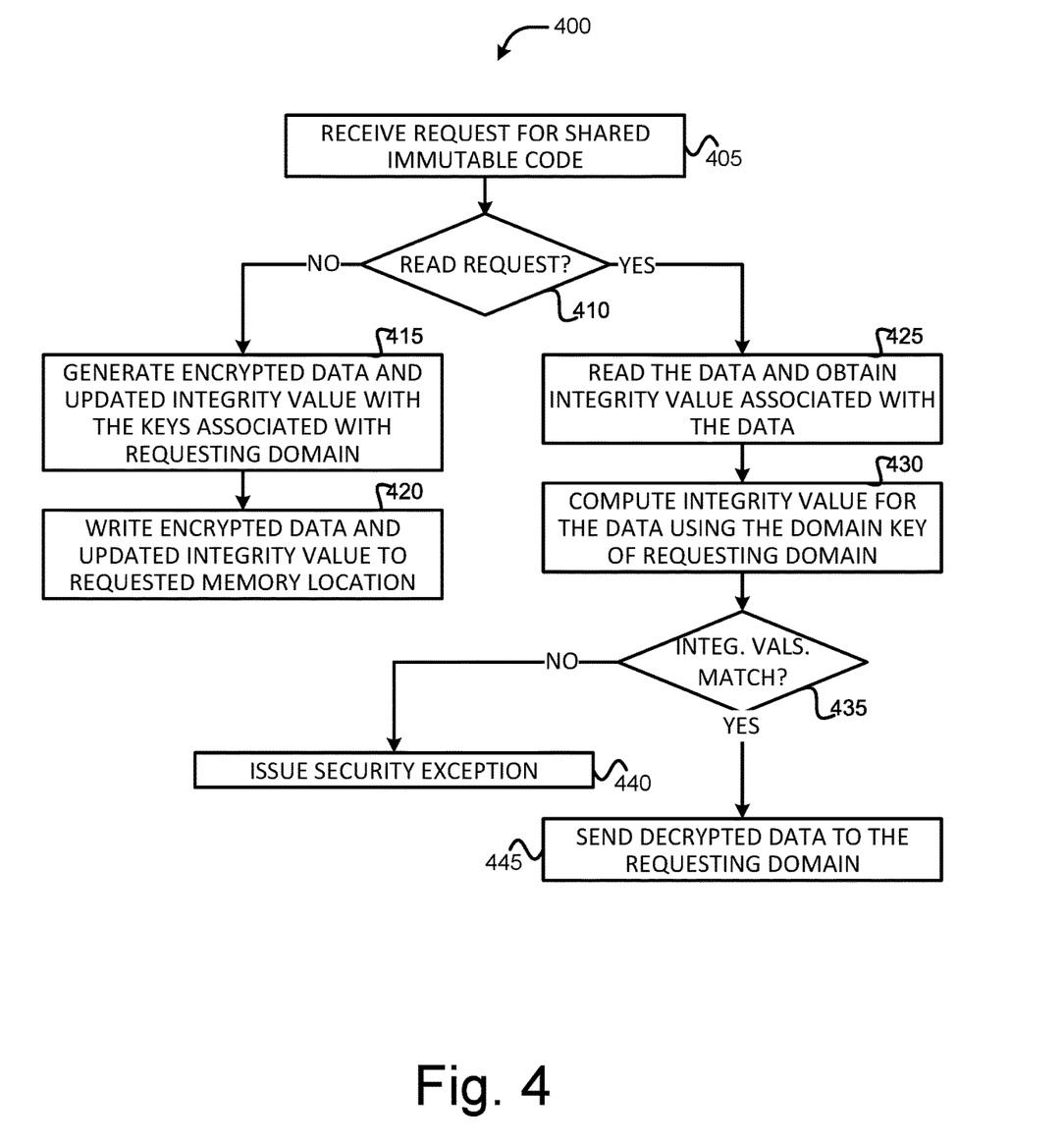
FIG. 4 illustrates an example process for providing immutability for mutually distrusting domains, in accordance with various embodiments.

FIG. 4 depicts an example process for providing immutability for mutually distrusting domains, in accordance with various embodiments. For illustrative purposes, the operations of process 400 are described as being performed by the CE 322 as implemented by the computer platform 300 in relation to the one or more hardware components of the platform 300 as shown and described with regard to FIGS. 1-3. However, it should be appreciated that other similar components/devices may perform the operations of process 400. Furthermore, while particular examples and orders of operations are illustrated by FIG. 4, in various embodiments, these operations may be re-ordered, broken into additional operations, combined, and/or omitted altogether.

Process 400 may begin at operation 405 where the CE 322 may receive a request or instruction to access shared immutable code. The request may be obtained from a domain 110 implemented by the processor circuitry 302 via the data access circuitry 312. The request may be in a format of an instruction set that is compatible with the processor circuitry 302. In various embodiments, the request to access shared immutable code may indicate an I-bit set. In some embodiments, to indicate the I-bit set, the request may include a logical address (also known as a "far pointer", "virtual address", and the like) that corresponds with a PTE that includes the I-bit set. Depending on the memory management implementation, the logical address may either directly correspond with the PTE or may correspond with a linear address and a page directory that indicates the PTE.

At operation 410, the CE 322 may determine whether the request is a read request. This determination may be based on the opcode included in the request obtained at operation 405, or some other portion of the request. If at operation 410 the CE 322 determines that the request is a read request, then the CE 322 may proceed to operation 425 to issue one or more read commands to the memory controller circuitry 314 to read data from the requested memory location (data line) and read an integrity value from a memory location (data line) associated with the requested data/memory location (data line).

At operation 430, the CE 322 may compute an integrity value for the requested data/memory location (data line) using a domain key of the requesting domain 110. In embodiments, the CE 322 may identify or determine the DID of the requesting domain 110 in order to obtain the domain key of the requesting domain 110 from the domain key DB 323. In one example, the DID may be passed to the CE 322 with or in the request. In another example, the CE 322 may obtain the DID from the memory controller circuitry 314 with the read data, such as in implementation where the DID is part of the physical address space of a domain 110 or the DID is implemented as separate bits introduced to the memory interface.

When the CE 322 obtains or identifies/determines the DID, the CE 322 may perform a lookup operation on the domain keys DB 323 to obtain an integrity key associated with the requesting domain 110. The CE 322 may then calculate an integrity value using the obtained integrity key.

In embodiments, the integrity key may be a message authentication code (MAC), an HMAC, or some other suitable integrity value.

At operation 435, the CE 322 may determine whether the computed integrity value matches the integrity value associated with the read data. If at operation 435 the CE 322 determines the integrity values do match, then the CE 322 may proceed to operation 445 to decrypt the data read from the requested memory location (data line) and send the decrypted data to the requesting domain 110. In embodiments, the CE 322 may obtain an encryption key associated with the requesting domain 110 from the domain keys DB 323 in a same or similar manner as discussed above with regard to the integrity key, which may be used to decrypt the data. If at operation 435 the CE 322 determines the integrity values do not match, then the CE 322 may proceed to operation 440 to issue a security exception, or take some other action.

Referring back to operation 410, if the CE 322 determines that the request is not a read request (e.g., when the request is a write request), then the CE 322 may proceed to operation 415 to generate encrypted data and update the integrity value using the encryption and integrity keys associated with the requesting domain 110. The keys may be obtained from the domain keys DB 323 in a same or similar manner as discussed previously. At operation 420, the CE 322 may issue a write command with the encrypted data and updated integrity value to the memory controller circuitry 314 to write the encrypted data to the requested memory location (data line) in memory circuitry 332. After performance of operation 420, 440, or 445, process 400 may end or repeat as necessary.

Illustrative examples of the devices, systems, and methods disclosed herein are provided below. The following examples pertain to further embodiments, and specifics in the examples may be used anywhere in the various embodiments discussed previously. An embodiment of the devices, systems, and methods discussed previously may include any one or more, and any combination of, the examples described infra.

Example 1 may include a platform for cloud computing, comprising: one or more processors to host a plurality of virtual machines (VMs), wherein individual VMs of the plurality of VMs are arranged into a plurality of mutually untrusting domains associated with individual cloud computing clients individual cloud computing clients of a plurality of cloud computing clients; a shared virtual machine manager (sVMM) operated by the one or more processors to manage operations of the individual VMs of each domain of the plurality of mutually untrusting domains, wherein the sVMM is respectively integrity protected with integrity keys associated with individual domains of the plurality of mutually untrusting domains, but not encrypted; and a cryptographic engine (CE) coupled with the one or more processors to provide separated encryption services for the plurality of mutually untrusting domains, and provide integrity protection services for individual ones of the plurality of mutually untrusting domains when accessing the sVMM.

Example 2 may include the platform of example 1 and/or some other examples herein, wherein, to provide integrity protection services, the CE is to: obtain a request comprising an immutable-bit (I-bit) along with a domain identifier (DID) of a requesting domain of the plurality of untrusting domain that issued the request; when the request is a read request indicating a requested memory location from which to read data, issue a read command to the requested memory location and a read command to another memory location including a first Message Authentication Code (MAC) for the requested memory location; generate a second MAC using an integrity key associated with the DID; send data read from the requested memory location to the one or more processors when the first MAC matches the second MAC; and issue a security exception to the one or more processors when the first MAC does not match the second MAC.

Example 3 may include the platform of example 2 and/or some other examples herein, wherein the CE comprises: a key table to store a plurality of domain keys comprising the integrity keys and a plurality of encryption keys in association with corresponding DIDs of a plurality of DIDs, wherein individual DIDs of the plurality of DIDs are associated with the individual domains; and a cryptographic (crypto-)pipeline to encrypt and decrypt, using a corresponding ones of the plurality of encryption keys, domain-specific data associated with the individual domains, wherein the CE is to: decrypt, using an encryption key of the plurality of encryption keys associated with the requesting domain, the data read from the requested memory location before the data is sent to the requesting domain, and generate the second MAC using the integrity key associated with the requesting domain.

Example 4 may include the platform of example 3 and/or some other examples herein, wherein, when the request is a write request indicating another requested memory location in which to write data, the CE is to: encrypt, using the encryption key associated with the requesting domain, the requested data via the crypto-pipeline and using a DID of the plurality of DIDs associated with an entity that issued the request; and issue a write command to write the encrypted data to the other requested memory location.

Example 5 may include the platform of example 3 or 4 and/or some other examples herein, wherein the CE is to: perform a lookup operation on the key table using the I-bit or the DID to obtain the integrity key of the requesting domain.

Example 6 may include the platform of example 2 and/or some other examples herein, wherein the CE is to: tag each memory access with the DID of the domain of the requesting domain.

Example 7 may include the platform of example 2 and/or some other examples herein, wherein the data read from the requested memory location includes program code for the sVMM, and wherein the other memory location including the first MAC is within a reserved memory area associated with the domain.

Example 8 may include the platform of example 7 and/or some other examples herein, wherein a portion of the DID comprises a physical address space of a physical memory associated the reserved memory area.

Example 9 may include the platform of example 7 or 8 and/or some other examples herein, wherein the program code of the sVMM is mapped to a page table entry that contains the I-bit.

Example 10 may include the platform of examples 2-9 and/or some other examples herein, further comprising: one or more processor cores comprising the one or more processors; data access circuitry to provide the request to the CE, wherein the data access circuitry is to obtain the request from the one or more processors; a memory controller to obtain the read command and the other read command from the CE, and provide, to the CE, the data and the first MAC of the requested memory location and the other memory location, respectively, and wherein the memory controller is communicatively coupled with the CE via a memory bus.

Example 11 may include the platform of example 10 and/or some other examples herein, wherein: the data access circuitry is implemented by microprocessor circuitry, image processing unit (IPU) circuitry, or display engine circuitry; the CE is implemented by the microprocessor circuitry, other microprocessor circuitry, or program code stored and executed within a secure enclave that is operated by the one or more processors; and the one or more processor cores, the data access circuitry, and the CE are communicatively coupled to one another via an in-die interconnect (IDI).

Example 12 may include one or more computer-readable storage media (CRSM) including program code, which when execute by one or more processors, causes a computer system to: host a plurality of virtual machines (VMs), wherein individual VMs of the plurality of VMs are arranged into a plurality of mutually untrusting domains associated with individual cloud computing clients individual cloud computing clients of a plurality of cloud computing clients; operate a shared virtual machine manager (sVMM) to manage operations of the individual VMs of each domain of the plurality of mutually untrusting domains, wherein the sVMM is respectively integrity protected with integrity keys associated with individual domains of the untrusting domains, but not encrypted; and operate a cryptographic engine (CE) to provide separated encryption services for the plurality of mutually untrusting domains, and provide integrity protection services for individual ones of the plurality of mutually untrusting domains when accessing the sVMM.

Example 13 may include the one or more CRSM of example 12 and/or some other examples herein, wherein, to provide integrity protection services, the program code, when executed, is to cause the computer system to: obtain a request from a requesting domain of the plurality of mutually untrusting domains, the request comprising an immutable-bit (I-bit) along with a domain identifier (DID) of the requesting domain; when the request is a read request indicating a requested memory location from which to read data, issue a read command to the requested memory location and a read command to another memory location including a first Message Authentication Code (MAC) for the requested memory location; generate a second MAC using a domain key associated with the DID; send data read from the requested memory location to the requesting domain when the first MAC matches the second MAC; and issue a security exception to the one or more processors when the first MAC does not match the second MAC.

Example 14 may include the one or more CRSM of example 13 and/or some other examples herein, wherein the program code, when executed, is to cause the computer system to operate the CE to: perform a lookup operation on a key table to obtain the domain key associated with the DID associated with the requesting domain; and perform one or more stages of a cryptographic pipeline to generate the second MAC using the domain key or another domain key associated with the DID of the requesting domain.

Example 15 may include the one or more CRSM of example 14 and/or some other examples herein, wherein, when the request is a write request indicating another requested memory location in which to write data, the program code, when executed, is to cause the computer system to operate the CE to: perform a lookup operation on the key table using at least the DID of the requesting domain to obtain the encryption key associated with the requesting domain; perform one or more stages of a cryptographic pipeline to encrypt the requested data and use a DID of the plurality of DIDs associated with an entity that issued the request; and control writing of the encrypted data to the other requested memory location.

Example 16 may include the one or more CRSM of example 14 and/or some other examples herein, wherein the program code, when executed, is to cause the computer system to operate the CE to: perform a lookup operation on the key table using at least the DID of the requesting domain to obtain the encryption key associated with the requesting domain; and perform one or more stages of a cryptographic pipeline to decrypt, using the obtained encryption key, the data read from the requested memory location before the data is sent to the requesting domain.

Example 17 may include the one or more CRSM of example 13 and/or some other examples herein, wherein the program code, when executed, is to cause the computer system to operate the CE to: tag each memory access with the DID of the requesting domain.

Example 18 may include the one or more CRSM of example 13 and/or some other examples herein, wherein the data read from the requested memory location includes program code for the sVMM, and wherein the other memory location including the first MAC is within a reserved memory area associated with the requesting domain.

Example 19 may include the one or more C2RSM of example 18 and/or some other examples herein, wherein a portion of the DID comprises a physical address space of a physical memory associated the reserved memory area, and wherein the program code of the sVMM is mapped to a page table entry that contains the I-bit.

Example 20 may include a computer-implemented method for sharing shared immutable code among a plurality of mutually untrusting domains, the method comprising: obtaining, by a cryptographic engine (CE), a request from a requesting domain of the plurality of mutually untrusting domains, the request comprising an immutable-bit (I-bit) along with a domain identifier (DID) of the requesting domain; issuing, by the CE when the request is a read request indicating a requested memory location from which to read data, a read command to a requested memory location and a read command to another memory location including a first Message Authentication Code (MAC) for the requested memory location; generating, by the CE, a second MAC using a domain key associated with the DID; sending, by the CE, data read from the requested memory location to the requesting domain when the first MAC matches the second MAC; and issuing, by the CE, a security exception to the one or more processors when the first MAC does not match the second MAC.

Example 21 may include the method of example 20 and/or some other examples herein, wherein the method comprises: performing, by the CE, a lookup operation on a key table to obtain the domain key associated with the DID of the requesting domain; and performing, by the CE, one or more stages of a cryptographic pipeline to generate the second MAC using the domain key or another domain key associated with the DID of the requesting domain.

Example 22 may include the method of example 21 and/or some other examples herein, wherein, when the request is a write request indicating another requested memory location in which to write data, the method comprises: performing, by the CE, a lookup operation on the key table using at least the DID of the requesting domain to obtain the encryption key associated with the requesting domain; performing, by the CE, one or more stages of a cryptographic pipeline to encrypt the requested data and use a DID of the plurality of DIDs associated with an entity that issued the request; and writing, by the CE, the encrypted data to the other requested memory location.

Example 23 may include the method of example 22 and/or some other examples herein, further comprising: performing, by the CE, a lookup operation on the key table using at least the DID of the requesting domain to obtain the encryption key associated with the requesting domain; and performing, by the CE, one or more stages of a cryptographic pipeline to decrypt, using the obtained encryption key, the data read from the requested memory location before the data is sent to the requesting domain.

Example 24 may include the method of example 20 and/or some other examples herein, further comprising: tagging, by the CE, each memory access with the DID of the requesting domain.

Example 25 may include the method of example 20 and/or some other examples herein, wherein one or more bits of the DID comprise a physical address space of a physical memory associated the reserved memory area, and wherein the program code of the shared immutable code is mapped to a page table entry that contains the I-bit.

Example 26 may include the method of examples 20-25 and/or some other examples herein, wherein: a plurality of virtual machines (VMs) are hosted by a platform in which the CE is implemented, wherein individual VMs of the plurality of VMs are arranged into corresponding ones of the plurality of mutually untrusting domains, and wherein each of the mutually untrusting domains are associated with individual cloud computing clients of a plurality of cloud computing clients, the shared immutable code comprises a shared virtual machine manager (sVMM) to manage operations of the individual VMs of each domain of the plurality of mutually untrusting domains, wherein the sVMM is respectively integrity protected with integrity keys associated with individual domains of the plurality of mutually untrusting domains, but not encrypted, and the data read from the requested memory location includes program code for the sVMM, and wherein the other memory location including the first MAC is within a reserved memory area associated with the requesting domain.

Example 27 may include a computer system to be employed in a cloud computing service, the computer system comprising: cloud computing means for: hosting a plurality of virtual machines (VMs), wherein individual VMs of the plurality of VMs are arranged into a plurality of mutually untrusting domains associated with individual cloud computing clients individual cloud computing clients of a plurality of cloud computing clients, and providing a shared virtual machine manager (sVMM) to manage operations of the individual VMs of each domain of the plurality of mutually untrusting domains, wherein the sVMM is respectively integrity protected with integrity keys associated with individual domains of the untrusting domains, but not encrypted; and cryptographic means for providing separated encryption services for the plurality of mutually untrusting domains, and provide integrity protection services for individual ones of the plurality of mutually untrusting domains when accessing the sVMM.

Example 28 may include the computer system of example 27 and/or some other examples herein, wherein the cryptographic means is for: obtaining a request from a requesting domain of the plurality of mutually untrusting domains, the request comprising an immutable-bit (I-bit) along with a domain identifier (DID) of the requesting domain; when the request is a read request indicating a requested memory location from which to read data, issuing a read command to the requested memory location and a read command to another memory location including a first Message Authentication Code (MAC) for the requested memory location; generating a second MAC using a domain key associated with the DID; sending data read from the requested memory location to the requesting domain when the first MAC matches the second MAC; and issuing a security exception to the one or more processors when the first MAC does not match the second MAC.

Example 29 may include the computer system of example 28 and/or some other examples herein, wherein the cryptographic means comprises: key storage means for storing a plurality of domain keys comprising the integrity keys and a plurality of encryption keys in association with corresponding DIDs of a plurality of DIDs, wherein individual DIDs of the plurality of DIDs are associated with the individual domains; and encryption means for encrypting and decrypt, using a corresponding ones of the plurality of encryption keys, domain-specific data associated with the individual domains, wherein the cryptographic means is for: decrying, using an encryption key of the plurality of encryption keys associated with the requesting domain, the data read from the requested memory location before the data is sent to the requesting domain, and generating the second MAC using the integrity key associated with the requesting domain.

Example 30 may include the computer system of example 29 and/or some other examples herein, wherein, when the request is a write request indicating another requested memory location in which to write data, the cryptographic means is for: performing a lookup operation on the key table using at least the DID of the requesting domain to obtain the encryption key associated with the requesting domain; performing one or more stages of a cryptographic pipeline to encrypt the requested data and use a DID of the plurality of DIDs associated with an entity that issued the request; and controlling writing of the encrypted data to the other requested memory location.

Example 31 may include the computer system of example 29 and/or some other examples herein, wherein the cryptographic means is for: performing a lookup operation on the key table using at least the DID of the requesting domain to obtain the encryption key associated with the requesting domain; and performing one or more stages of a cryptographic pipeline to decrypt, using the obtained encryption key, the data read from the requested memory location before the data is sent to the requesting domain.

Example 32 may include the computer system of example 28 and/or some other examples herein, wherein the cryptographic means is for: tagging each memory access with the DID of the requesting domain.

Example 33 may include the computer system of examples 28-32 and/or some other examples herein, wherein the data read from the requested memory location includes program code for the sVMM, and wherein the other memory location including the first MAC is within a reserved memory area associated with the requesting domain.

Example 34 may include the computer system of example 33 and/or some other examples herein, wherein a portion of the DID comprises a physical address space of a physical memory associated the reserved memory area, and wherein the program code of the sVMM is mapped to a page table entry that contains the I-bit.

Example 35 may include an apparatus comprising means to perform one or more elements of a method described in or related to any of examples 1-34, or any other method or process described herein.

Example 36 may include one or more non-transitory computer-readable media comprising instructions to cause an electronic device, upon execution of the instructions by one or more processors of the electronic device, to perform one or more elements of a method described in or related to any of examples 1-34, or any other method or process described herein.

Example 37 may include an apparatus comprising logic, modules, or circuitry to perform one or more elements of a method described in or related to any of examples 1-34, or any other method or process described herein.

Example 38 may include a method, technique, or process as described in or related to any of examples 1-34, or portions or parts thereof.

Example 39 may include an apparatus comprising: one or more processors and one or more computer readable media comprising instructions that, when executed by the one or more processors, cause the one or more processors to perform the method, techniques, or process as described in or related to any of examples 1-34, or portions thereof.

Example 40 may include a signal as described in or related to any of examples 1-34, or portions or parts thereof.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. A platform for cloud computing, comprising:
one or more hardware processors arranged to host a plurality of virtual machines (VMs), wherein individual VMs of the plurality of VMs are arranged into a plurality of mutually untrusting domains associated with individual cloud computing clients of a plurality of cloud computing clients;
a single immutable shared virtual machine manager (sVMM) operated by the one or more hardware processors, the sVMM arranged to manage operations of the individual VMs of each domain of the plurality of mutually untrusting domains, wherein the sVMM is shared among the plurality of mutually untrusting domains without replicating the sVMM across each of the plurality of mutually untrusting domains and integrity protected with respective integrity values associated with individual domains of the plurality of mutually untrusting domains but not encrypted, and the respective integrity values being stored in a reserved memory space; and
a cryptographic engine (CE) coupled with the one or more hardware processors, the CE arranged to:
provide separated encryption services for the plurality of mutually untrusting domains, and
provide integrity protection services for individual ones of the plurality of mutually untrusting domains when accessing the sVMM, wherein, to provide integrity protection services, the CE is arranged to:
obtain a read request indicating a requested memory location from which to read data, the read request including an immutable-bit (I-bit) and a domain identifier (DID) of a requesting domain of the plurality of mutually untrusting domains that issued the request;

issue a read command to the requested memory location;

issue another read command to another memory location in the reserved memory space associated with the requested memory location, the other memory location storing a first integrity value of the respective integrity values;

generate a second integrity value using a domain key associated with the DID;

send data read from the requested memory location to the one or more hardware processors when the first integrity value matches the second integrity value; and issue a security exception to the one or more hardware processors when the first integrity value does not match the second integrity value.

2. The platform of claim 1, wherein the CE comprises:

a key table arranged to store a plurality of domain keys including the domain key associated with the DID, each of the plurality of domain keys including at least one encryption key and at least one integrity key, and each of the plurality of domain keys being stored in association with corresponding DIDs of a plurality of DIDs, wherein individual DIDs of the plurality of DIDs identify the individual domains; and a cryptographic pipeline (crypto-pipeline) arranged to encrypt and decrypt domain-specific data associated with the individual domains using corresponding encryption keys, and wherein, to provide integrity protection services, the CE is arranged to:

decrypt, via the crypto-pipeline and using an encryption key associated with the requesting domain, the data read from the requested memory location before the data is sent to the requesting domain, and generate the second integrity value using an integrity key associated with the requesting domain.

3. The platform of claim 2, wherein, to provide integrity protection services, the CE is arranged to:

obtain a write request indicating a requested memory location in which to write data, the write request comprising an I-bit along with the DID of the requesting domain;

encrypt, using the encryption key associated with the requesting domain, the requested data via the crypto-pipeline and using the DID of the requesting domain; and issue a write command to write the encrypted data to the other requested memory location.

4. The platform of claim 2, wherein the CE is arranged to:

perform a lookup operation on the key table using the I-bit or the DID to obtain the integrity key of the requesting domain.

5. The platform of claim 1, wherein the data read from the requested memory location includes shared immutable program code of the sVMM, and wherein the other memory location including the first integrity value is within the reserved memory space.

6. The platform of claim 5, wherein a portion of the DID comprises a physical address space of a physical memory associated with the reserved memory space.

7. The platform of claim 5, wherein the shared immutable program code of the sVMM is mapped to one or more page table entries (PTEs), wherein the PTEs of the shared immutable program code includes an I-bit for each of the plurality of mutually untrusting domains.

8. The platform of claim 1, wherein the one or more hardware processors include one or more processor cores, and the platform further comprises:

data access circuitry to provide the request to the CE, wherein the data access circuitry is to obtain the request from the one or more hardware processors;

a memory controller to obtain the read command and the other read command from the CE, and provide, to the CE, the data and the first integrity value of the requested memory location and the other memory location, respectively, and wherein the memory controller is communicatively coupled with the CE via a memory bus.

9. The platform of claim 8, wherein:

the first integrity value is a first Message Authentication Code (MAC) and the second integrity value is a second MAC;

the data access circuitry is implemented by microprocessor circuitry, image processing unit (IPU) circuitry, graphics processing unit (GPU), or display engine circuitry;

the CE is implemented by the microprocessor circuitry or other microprocessor circuitry; and the one or more processor cores, the data access circuitry, and the CE are communicatively coupled to one another via an in-die interconnect (IDI).

10. One or more non-transitory computer-readable storage media (NTCRSM) comprising program code, wherein execution of the program code by one or more processors is to cause a computer system to:

host a plurality of virtual machines (VMs), wherein individual VMs of the plurality of VMs are arranged into a plurality of mutually untrusting domains associated with individual cloud computing clients of a plurality of cloud computing clients;

operate a single immutable shared virtual machine manager (sVMM) to manage operations of the individual VMs of each domain of the plurality of mutually untrusting domains, wherein the sVMM is shared among the plurality of mutually untrusting domains without replicating the sVMM across each of the plurality of mutually untrusting domains and is integrity protected with respective domain keys associated with individual domains of the untrusting domains, but not encrypted, the respective domain keys being stored in a reserved memory space; and operate a cryptographic engine (CE) to provide separated encryption services for the plurality of mutually untrusting domains, and provide integrity protection services for individual ones of the plurality of mutually untrusting domains when accessing the sVMM, wherein, to provide integrity protection services, execution of the program code is to cause the computer system to:

obtain a read request from a requesting domain of the plurality of mutually untrusting domains indicating a requested memory location from which to read data, the read request comprising an immutable-bit (I-bit) along with a domain identifier (DID) of the requesting domain;

issue a read command to the requested memory location;

issue a read command to another memory location in the reserved memory space associated with the requesting domain, the other memory location including a first Message Authentication Code (MAC);

generate a second MAC using a domain key associated with the DID;

send data read from the requested memory location to the requesting domain when the first MAC matches the second MAC; and issue a security exception to the one or more processors when the first MAC does not match the second MAC.

11. The one or more NTCRSM of claim 10, wherein execution of the program code is to cause the computer system to operate the CE to:

perform a lookup operation on a key table to obtain the domain key associated with the DID associated with the requesting domain; and perform one or more stages of a cryptographic pipeline to generate the second MAC using the domain key or another domain key associated with the DID of the requesting domain.

12. The one or more NTCRSM of claim 11, wherein execution of program code is to cause the computer system to operate the CE to:

obtain a write request from the requesting domain indicating a requested memory location in which to write data, the write request comprising an I-bit along with the DID of the requesting domain;

perform a lookup operation on the key table using at least the DID of the requesting domain to obtain an encryption key associated with the requesting domain;

perform one or more stages of a cryptographic pipeline to encrypt the requested data and use a DID of the plurality of DIDs associated with an entity that issued the request; and write the encrypted data to the other requested memory location.

13. The one or more NTCRSM of claim 11, wherein execution of the program code is to cause the computer system to operate the CE to:

perform a lookup operation on the key table using at least the DID of the requesting domain to obtain an encryption key associated with the requesting domain; and perform one or more stages of a cryptographic pipeline to decrypt, using the obtained encryption key, the data read from the requested memory location before the data is sent to the requesting domain.

14. The one or more NTCRSM of claim 12, wherein the data read from the requested memory location includes program code for the sVMM, and wherein the other memory location including the first MAC is within a reserved memory area associated with the requesting domain.

15. The one or more NTCRSM of claim 14, wherein a portion of the DID comprises a physical address space of a physical memory associated with the reserved memory area, and wherein the program code of the sVMM is mapped to one or more page table entries (PTEs), wherein the PTEs of the program code of the sVMM includes an I-bit for each of the plurality of mutually untrusting domains.

16. A computer-implemented method for sharing shared immutable code of a single immutable shared virtual machine manager (sVMM) among a plurality of mutually untrusting domains without replicating the sVMM across each of the plurality of mutually untrusting domains, each of the mutually untrusting domains are associated with individual cloud computing clients of a plurality of cloud computing clients, the sVMM is arranged to manage operations of the individual VMs of each domain of the plurality of mutually untrusting domains, the sVMM is respectively integrity protected with integrity keys associated with individual domains of the plurality of mutually untrusting domains, but not encrypted, and the method comprising:

obtaining, by a cryptographic engine (CE), a read request from a requesting domain of the plurality of mutually untrusting domains indicating a requested memory location from which to read data, the read request comprising an immutable-bit (I-bit) along with a domain identifier (DID) of the requesting domain, wherein a plurality of virtual machines (VMs) are hosted by a platform that implements the CE, and individual VMs of the plurality of VMs are arranged into corresponding ones of the plurality of mutually untrusting domains;

issuing, by the CE, a read command to a requested memory location, the data read from the requested memory location including program code for the sVMM;

issuing, by the CE, a read command to another memory location in a reserved memory space associated with the requesting domain, the other memory location storing a first Message Authentication Code (MAC) associated with the requesting domain, and the reserved memory space to store MACs for each of the plurality of mutually untrusting domains;

generating, by the CE, a second MAC using a domain key associated with the DID;

sending, by the CE, data read from the requested memory location to the requesting domain when the first MAC matches the second MAC; and issuing, by the CE, a security exception to the one or more processors when the first MAC does not match the second MAC.

17. The method of claim 16, wherein the method comprises:

performing, by the CE, a lookup operation on a key table to obtain the domain key associated with the DID of the requesting domain; and performing, by the CE, one or more stages of a cryptographic pipeline to generate the second MAC using the domain key or another domain key associated with the DID of the requesting domain.

18. The method of claim 17, further comprising:

obtaining, by the CE, a write request from the requesting domain indicating a requested memory location in which to write data, the write request comprising an I-bit along with the DID of the requesting domain;

performing, by the CE, a lookup operation on the key table using at least the DID of the requesting domain to obtain an encryption key associated with the requesting domain;

performing, by the CE, one or more stages of a cryptographic pipeline to encrypt the requested data and use a DID of the plurality of DIDs associated with an entity that issued the request; and writing, by the CE, the encrypted data to the other requested memory location.

19. The method of claim 18, further comprising:

performing, by the CE, a lookup operation on the key table using at least the DID of the requesting domain to obtain the encryption key associated with the requesting domain; and performing, by the CE, one or more stages of a cryptographic pipeline to decrypt, using the obtained encryption key, the data read from the requested memory location before the data is sent to the requesting domain.

20. The method of claim 16, further comprising: tagging, by the CE, each memory access with the DID of the requesting domain.

21. The method of claim 16, wherein one or more bits of the DID comprise a physical address space of a physical memory associated with the reserved memory area, and wherein the program code of the shared immutable code is mapped to one or more page table entries (PTEs), wherein the PTEs of the program code of the sVMM includes an I-bit for each of the plurality of mutually untrusting domains.

22. The platform of claim 1, wherein the integrity protection services involve integrity verification of a data line loaded from memory using the respective integrity values for requesting domains of the plurality of mutually untrusting domains.

23. The one or more NTCRSM of claim 10, wherein the integrity protection services involve integrity verification of a data line loaded from memory using the respective domain keys for requesting domains of the plurality of mutually untrusting domains.

24. The computer-implemented method of claim 16, further comprising:
   providing integrity protection services for individual ones of the plurality of mutually untrusting domains when accessing the sVMM, wherein providing the integrity protection services comprises verifying integrity of a data line loaded from memory using respective ones of the integrity keys associated with the individual domains for requesting domains of the plurality of mutually untrusting domains.

* * * * *